United States Patent [19]

Loria et al.

[11] Patent Number: 5,393,331
[45] Date of Patent: Feb. 28, 1995

[54] DROP-ON-DEMAND INK COMPOSITION WITH ENVIRONMENTAL ADVANTAGES

[75] Inventors: Adrian M. Loria, Wilmette; Bruce A. Lent, Oak Park, both of Ill.

[73] Assignee: Videojet Systems International, Inc., Wood Dale, Ill.

[21] Appl. No.: 121,296

[22] Filed: Sep. 14, 1993

[51] Int. Cl.$^6$ ............................................... C09D 11/02
[52] U.S. Cl. .................................... 106/20 R; 106/224
[58] Field of Search ................. 106/20 R, 22 R, 22 H

[56] References Cited

U.S. PATENT DOCUMENTS

| | | | |
|---|---|---|---|
| 5,125,696 | 6/1992 | Nishiwaki et al. | 106/22 K |
| 5,137,570 | 8/1992 | Nishiwaki et al. | 106/22 K |
| 5,141,556 | 8/1992 | Matrick | 106/22 R |
| 5,160,372 | 11/1992 | Matrick | 106/19 R |

*Primary Examiner*—Helene Klemanski
*Attorney, Agent, or Firm*—Leydig, Voit & Mayer, Ltd.

[57] ABSTRACT

An ink composition suitable for drop-on-demand ink jet printing on porous substrates comprising water, a colorant, a non-teratogenic and non-carcinogenic humectant, and a solid penetrant, which ink composition has a volatile organic content of less than 300 grams per liter.

2 Claims, No Drawings

DROP-ON-DEMAND INK COMPOSITION WITH ENVIRONMENTAL ADVANTAGES

FIELD OF THE INVENTION

The present invention relates to ink jet printing compositions for use on porous substrates and, more particularly to ink jet compositions for drop-on-demand ink jet printing that are non-teratogenic and non-carcinogenic and have reduced levels of volatile organic compounds.

BACKGROUND OF THE INVENTION

Ink jet printing is a well-known technique by which printing is accomplished without contact between the printing device and the substrate on which the printed characters are deposited. Ink jet printing systems are generally of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At this break-up point, the droplets are charged in accordance with digital data signals. These drops are then passed through an electrostatic field which adjusts the trajectory of each droplet. The droplets are either directed back to a gutter for recirculation or to a specific location on the substrate to create the desired character matrix.

In drop-on-demand systems, a droplet is expelled under pressure from a valve directly to a position on the substrate in accordance with the digital data signals. A droplet is not formed or expelled unless it is to be jetted to the substrate. Since drop-on-demand systems require no ink recovery, charging, or deflection, the system is much simpler than the continuous stream system.

In general, a drop-on-demand ink composition must meet certain rigid requirements to be useful in non-contact printing operations. These relate to viscosity, solubility, compatibility of components and penetration into the porous substrate. Further, the ink must penetrate quickly and be smear resistant, must be capable of passing through the print head valves without clogging, and must permit rapid cleanup of the machine components with minimum effort.

Moreover, for an ink composition to be useful for printing on porous substrates, such as paper and corrugated cardboard, it must adequately wet the substrate and penetrate the surface of the substrate. Presently-used ink for such applications conventionally contains a dye, a carrier, a liquid penetrant, a humectant, and other components. These humectants are generally glycols, polyglycols, or glycol ethers.

The penetrant and the humectant are volatile organic compounds which pose toxicity and flammability problems for the ink jet formulator. However, the use of volatile organic compounds is undesirable for an additional reason—they pose an environmental hazard. After the ink has been applied to the substrate, the volatile organic compounds evaporate, releasing organic compounds into the atmosphere. These volatile organic compounds adversely affect the environment in the atmosphere and are the subject of both federal and state governmental regulations.

Volatile organic compounds, also known as VOC, are defined as any compound of carbon that evaporates from a paint or coating film under specific test conditions (EPA Method 24 or ASTM Method D-3960). The amount of volatile organic compounds present in a given composition in grams per liter of coating can be determined by using the following formula:

$$VOC(g/l) = \frac{W_s - W_w - W_{es}}{V_m - V_w - V_{es}}$$

where:

$W_s$ is the weight of volatile compounds in grams;
$W_w$ is the weight of water in grams;
$W_{es}$ is the weight of exempt compounds in grams;
$V_m$ is the volume of material in liters;
$V_w$ is the volume of water in liters; and
$V_{es}$ is the volume of exempt compounds in liters.

In the above formula, exempt compounds are volatile organic compounds whose use is specifically sanctioned by regulatory agencies. Trichloroethane is an example of an exempt compound.

The maximum acceptable level of volatile organic compounds varies for different coating applications. For example, in California the maximum acceptable level of volatile organic compounds for porous printing applications is 300 grams/liter.

The problem of VOC content in ink compositions for non-porous printing applications has been addressed. For example, copending application Ser. No. 07/958,267, by the same inventors, discloses ink compositions comprising an aqueous resin solution and an organic pigment that have a VOC content of less than 500 grams per liter, and preferably less than 340 grams/liter. However, no such compositions have been found for drop-on-demand printing on porous substrates that comply with VOC regulations.

Moreover, as stated earlier, conventional inks for ink jet printing on porous substrates commonly contain glycol ethers, which act as humectants to prevent nozzle or valve clogging or tip drying in the print head, and to increase ink penetration into the substrate. These compounds, in addition to being volatile organic compounds, have also been found to be teratogenic and possibly carcinogenic.

From the foregoing, it is clear that a need exists for an aqueous drop-on-demand ink composition for printing on porous substrates that contains low levels of volatile organic compounds, and-is non-teratogenic and non-carcinogenic, and has good penetration and drying properties. The resulting composition would therefore, be environmentally friendly. In addition, the ink would pose no health hazard to people.

SUMMARY OF THE INVENTION

The present invention provides an ink composition for use in drop-on-demand ink jet operations for printing on porous substrates, which has low levels of volatile organic compounds and that is both non-teratogenic and non-carcinogenic. The composition utilizes deionized water, a colorant, a non-carcinogenic and non-teratogenic humectant and a solid penetrant. As a result, the toxicity, flammability and disposal problems inherent in the use of organic solvents are avoided. More importantly, the ink composition of the present invention complies with the present government standards for acceptable levels of volatile organic compounds.

DETAILED DESCRIPTION OF THE PREFERRED EMBODIMENTS

As described hereinabove, the ink compositions of the present invention comprise water, a colorant, an non-teratogenic and non-carcinogenic humectant, a solid penetrant, and other optional components which may be present in carefully balanced proportions to achieve preferred operation of the ink in a drop-on-demand ink jet printer.

In general, the ink compositions of the present invention exhibit the following characteristics for use in ink jet printing systems: (1) a viscosity from about 1.6 to about 7.0 centipoises at 25° C. and (2) a specific gravity between 1.03–1.05.

The inks dry due to absorption within about 1 to about 3 seconds, with good penetration when printed on porous substrates. The ink compositions of the present invention may thus be used for graphic applications on porous substrates such as paper, corrugated cardboard and other porous graphic paper products.

The ink compositions of the present invention contain, as indicated, low levels of volatile organic compounds. To contain a low level of volatile organic compounds, the ink composition should be formulated so that it has a volatile organic compound level (VOC) of less than 300 grams/liter.

THE CARRIER

Water is used as the carrier in the ink compositions of the present invention. Deionized water is preferred, for reasons of purity. The water should be present in an amount of from about 70% to about 90% by weight of the ink composition, with an amount from about 85% to about 90% being preferred.

THE COLORANT

Useful colorants include acid dyes, such as Acid Black 2, Acid Red 14, Acid Yellow 23, and Acid Blue 15. Direct dyes can also be used, such as Direct Blue 279, or the following Direct Black dyes: Fastusol Black 18 (BASF); Black SP Liquid (Miles); Black HF Liquid (Miles); and Direct Black 170, available as Keyamine Black from Keystone Corp. Reactive dyes, such as Red 187 and Blue 49, can be used for water resistant and textile applications.

The colorant should be present in an amount of from about 3% to about 20% by weight of the ink composition, with an amount of from about 3% to about 6% being preferred.

THE HUMECTANT

As stated above, the humectant prevents the ink jet tip from drying, and the nozzle/valve from clogging. The humectant must be non-carcinogenic and non-teratogenic. Humectants useful in the ink compositions of the present invention include glycerol, and polyethylene glycols, such as Carbowax 200, Carbowax 300, Carbowax 400, Carbowax 600, and Carbowax 3350, all available from Union Carbide. Glycerol is preferred, because it is completely soluble in water, has a high flash point, has a very low freezing point and is odorless. Glycerol is also colorless.

The humectant can also act as a viscosity control agent. Different molecular weights of polyethylene glycols have different solution viscosities. Ink viscosity can be tailor-made by making use of this property.

The humectant should be present in an amount from about 2% to about 8% by weight of the ink composition, with an amount of from about 4% to about 8% being preferred.

THE SOLID PENETRANT

The solid penetrant lowers the surface tension of the ink so that it can more easily penetrate the porous substrate. Since it is a solid, it does not contribute to the volatile organic compound content of the ink composition. Useful solid penetrants include Nekal BX78, available from Rhone-Poulenc, and Surfynol 104, available from Air Products and Chemicals. The solid penetrant should be present in an amount of from about 2% to about 8% by weight of the ink composition, with an amount of from about 4% to about 8% by the weight of the ink composition being preferred.

OPTIONAL COMPONENTS

Other components may also be included in the ink compositions of the present invention to impart characteristics desirable for ink jet printing applications. These components include defoamers, which improve ink manufacturing and printer performance. Suitable defoamers include acetylenic diols (commercially available as Surfynol 104 from Air Products and Chemicals), petroleum blends (commercially available as Napco NDW, Dehydran C, and Foamaster NS, all from Henkel Corp.), silicone-based defoamers (commercially available as Dow Corning 150 from Dow Corning, and Silwet l-77, Silwet 720, Silwet 722, and Silwet 7002, all available from Union Carbide) and XRM-3588E, Dee Fo PI-29, and Dee Fo 2020E/50, all available from Ultra Additives. The defoamer, if used, should be present in an amount of from about 0.03% to about 0.10% by weight of the ink composition, with an amount from about 0.03% to about 0.06% being preferred.

It may also be desirable to add a bactericide. Water based inks are susceptible to bacterial attack fouling-up ink manufacturing equipments and printers. Suitable bactericides include methyl para-hydroxybenzoate, available as Methylparaben from Aldrich Chemicals, and meta-dioxane, available as Giv-Gard DXN from Givudan Corp. The bactericide, if one is used, should be present in an amount from about 0.10% to about 0.20% by weight of the .ink composition.

A pH control agent may also be used in the ink composition to insure that the components of the ink composition remain soluble throughout the period of storage and use. The use of a pH control agent is also desirable to prevent corrosion of the metal components of the ink jet printer. For this purpose, it is desirable to maintain the pH of the ink at about 7.0–10.5, and preferably at about 7.5 to 10. The pH is dependent upon the components which are employed in the composition. Although use can be made of inorganic bases such as sodium hydroxide and potassium hydroxide, their presence in the printed character leads to poor water resistance after drying. It is preferred to make use of an organic base which can be eliminated by evaporation. Best use is made of a pH adjusting agent that evaporates rapidly to accelerate development of water resistance upon aging. Thus, while use can be made of organic amines, it is preferred to make use of ammonium hydroxide for controlling pH within the desired range. Morpholine can also be used for long term stability during storage of an ink composition. Triethanolamine can also be used.

Typically, the pH control is present in an amount form about 0.10% to about 0.50% by weight of the ink composition. The optimal amount will vary depending upon the specific components of the ink composition.

The ink compositions of the present invention can be made by conventional means. One method is as follows: The water should be added into a mixing tank. Then the humectant should be added and mixed with the water. After the mixing is completed, the solid penetrant should be added and mixed thoroughly into the composition. Finally, the colorant should be added, and the composition should be mixed thoroughly and then filtered.

The following Example is illustrative of an ink jet composition of the present invention.

| Material | Percent |
| --- | --- |
| Acid Yellow #23 | 0.70 |
| Acid Red #14 | 0.40 |
| Glycerol | 4.00 |
| Methylparaben | 0.20 |
| XRM 3588E Defoamer | 0.05 |
| Nekal BX 78 | 2.20 |

| Material | Percent |
| --- | --- |
| -continued | |
| SP Black HF Dye | 15.00 |
| Deionized Water | 77.25 |
| Triethanolamine | 0.20 |
| | 100.00 |

The ink jet composition had a VOC content of 292 grams/liter.

We claim:

1. An ink composition suitable for drop-on-demand ink jet printing on porous substrates, comprising from about 70% to about 90% water, from about 3% to about 20% of a colorant, from about 2% to about 8% of a non-teratogenic and non-carcinogenic humectant, and from about 2% to about 8% of a solid penetrant, based on the weight of said ink composition, said ink composition having a volatile organic content of lees than 300 grams per liter.

2. The ink composition of claim 1, further comprising a bactericide and a defoamer.

* * * * *